(12) United States Patent
Castro de Rosa

(10) Patent No.: US 12,218,976 B2
(45) Date of Patent: Feb. 4, 2025

(54) SYSTEMS AND METHODS FOR CONTAINER SERVER PROTECTION

(71) Applicant: Fortinet, Inc., Sunnyvale, CA (US)

(72) Inventor: Sergio Henrique Marcelino Castro de Rosa, Sao Paulo (BR)

(73) Assignee: Fortinet, Inc., Sunnyvale, CA (US)

( * ) Notice: Subject to any disclaimer, the term of this patent is extended or adjusted under 35 U.S.C. 154(b) by 349 days.

(21) Appl. No.: 17/591,400

(22) Filed: Feb. 2, 2022

(65) Prior Publication Data

US 2023/0247055 A1 Aug. 3, 2023

(51) Int. Cl.
   *H04L 9/40* (2022.01)
(52) U.S. Cl.
   CPC .......... *H04L 63/20* (2013.01); *H04L 63/0428* (2013.01)

(58) Field of Classification Search
   CPC .. H04L 63/20; H04L 63/0428; H04L 63/0272
   USPC .............................................. 726/3
   See application file for complete search history.

(56) References Cited

U.S. PATENT DOCUMENTS

| | | | |
|---|---|---|---|
| 11,606,208 B2 * | 3/2023 | Saravanan | H04L 9/3213 |
| 2017/0170987 A1 * | 6/2017 | Kumar | H04L 47/193 |
| 2021/0194853 A1 * | 6/2021 | Xiao | H04L 43/028 |
| 2021/0344692 A1 * | 11/2021 | Cooper | H04L 63/205 |

* cited by examiner

*Primary Examiner* — Lan Dai T Truong
(74) *Attorney, Agent, or Firm* — Jaffery Watson Hamilton & DeSanctis LLP

(57) ABSTRACT

Systems, devices, and methods are discussed for enhancing security in a container server environment.

21 Claims, 5 Drawing Sheets

SYSTEMS AND METHODS FOR CONTAINER SERVER PROTECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for secure data transfer, and more particularly to systems and methods for enhanced security in a container server environment.

BACKGROUND

It is common for applications and/or databases to be maintained on third party servers with data security provided by a third party that owns the server. Such data security is suspect and often relies upon generic security operations provided within, for example, operating systems executing on the third party server under control of the third party. Use of such third party servers offer little if any opportunity to enhance or control data security in relation to the third party server.

Hence, there exists a need in the art for enhanced security options in relation to container servers.

SUMMARY

Various embodiments provide systems and methods for enhanced security in a container server environment.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
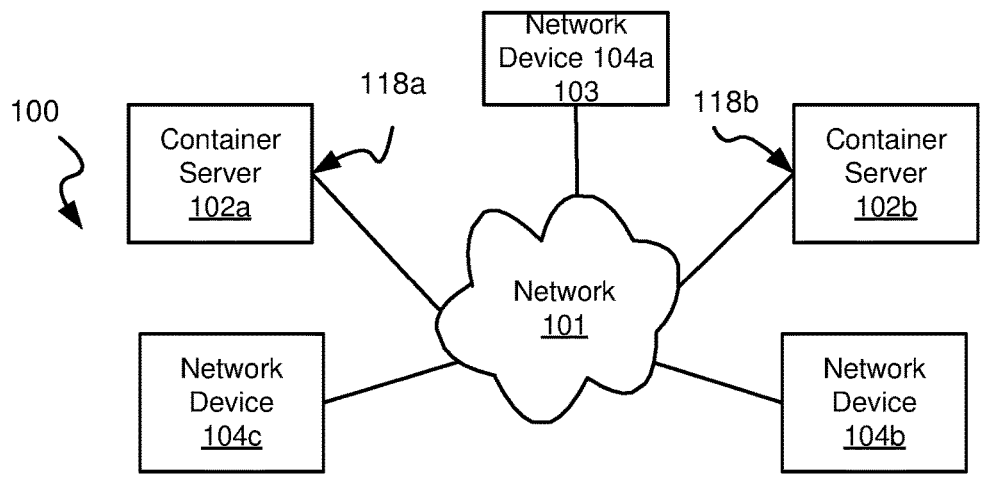
FIGS. 1A-1D illustrate a network architecture including multiple container servers that each include a virtual machine network security appliance in accordance with some embodiments.

Various embodiments provide systems and methods for enhanced security in a container server environment.

Various embodiments utilize multiple network communication paths to segregate keys from encrypted data. In some instances, the two or more of the multiple network paths are supported by different communications providers, thereby providing a further security enhancement. In various instances, the multiple network communication paths are distinct from end to end to limit the possibility of an attacker seeing both data and keys on the same communication path. Such distinctness may, for example, preclude use of common infrastructure between the multiple network communication paths. Such embodiments perform, where possible, Internet Protocol Security (IPSec) on one communication path, and transfer data on a separate communication path. Where not possible, modifications to the IPSec may be made to mitigate insecurity.

In some cases, a system that to segregates keys from encrypted data may be integrated into a software-defined wide area network (SD-WAN) having at least two WAN links from two different operators (e.g., an internet service provider (ISP) A and an ISP B), and one single hub site, also with WAN links from the same ISPs. In a standard SD-WAN implementation, IPSec tunnels would be established to the hub over each of the WAN links, but such may not be quantum-secure. To address this security issue, the embodiment sends an out of band key exchange over a communication path provided by ISP A for encrypted data transferred via a communication path provided by ISP B; and an out of band key exchange over a communication path provided by ISP B for encrypted data transferred via a communication path provided by ISP A. Such an approach ensures that if an attacker should be recording data on either of these links, there will not be enough data (even with a quantum computer) to decrypt the encrypted data.

In such an embodiment, the communication paths are terminated on the same pair of network gateways (spoke and hub). To created such bifurcated secure data transfer is done similar to that performed in standard internet key exchange (IKE) protocol, but with the key being sent over one communication link and the encrypted data sent over another communication link. Which communication link performs key exchange and which performs encrypted data exchange may be randomly selected, based upon a default configuration, or based upon the relative characteristics of the available communication paths (this could be useful when for example two out of three communication path are provided by the same operator, in which case the selection should prioritize the other operator).

The out-of-band key exchange could be sent in addition to the in-band Diffie Hellman, keeping the normal IKE signaling for each tunnel on its "normal" path, then but independently sharing a key over the secondary path. This key exchange could be another Diffie Hellman exchange, or some other method, then combined with the normal Diffie Hellman key for the derivation of session keys. Based upon the disclosure provided herein, one of ordinary skill in the art will recognize a variety of approaches that may be used where augmenting the in-band Diffie Hellman is desired.

The greater the difference between the selected communication paths, the greater the security of the secure data transfer. To this end, it is noted the potential aggregation of the two communication paths that can happen at two points:

(1) In the transport network: even two different ISPs could find themselves sharing transport links; and/or
(2) At the hub itself. Many SD-WAN implementations don't have a one-to-one mapping of ISPs between hub and spoke, and in the worst case, the hub may only have a single WAN link.

Case 2 can be avoided by ensuring that distinct WAN links are provisioned at the hub. Case 1 is potentially more difficult to avoid since the customer generally does not have visibility of the end-to-end path. However, even if an attacker has access to an aggregated link (i.e., to both key exchange and encrypted data), there is still a considerable difficulty in correlating the two sessions. In a traditional IPSec case, the endpoints of the IKE session carrying the exchange and the encapsulating security payload (ESP) session carrying the data would be the same. In the quantum-safe case proposed here, the addresses are different.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments.

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Various embodiments provide methods for providing network security services that include: receiving, by a virtual machine network security appliance implemented in a container server, a request to transfer data to a container application implemented in the container server, wherein the request indicates a source device; performing, by the virtual machine network security appliance, a security process on the data to yield security processed data; and providing, by the virtual machine network security appliance, the security processed data to the container application via a communication path internal to the container server.

In some instances of the aforementioned embodiments where the communication path internal to the container server is a first internal communication path, the container application is a first container application, the source device is a second container application implemented in the container server, receiving the request is done via a second internal communication path. In some such instances, the methods further include: configuring the first internal communication path; and configuring the second internal communication path.

In various instances of the aforementioned embodiments where the source device is a network device outside of the container server, receiving the request is done via an external communication path between the virtual machine network security appliance and an external port of the container server. In some such instances, the method further includes: configuring the communication path internal to the container server; and configuring external communication path between the virtual machine network security appliance and an external port of the container server. In various cases where the container server is a first container server, the network device is a container application implemented on a second container server.

In some instances of the aforementioned embodiments where the request is a first request, the methods further include: receiving, by the virtual machine network security appliance, a second request to transfer data from the container application to a network device outside of the container server; encrypting, by the virtual machine network security appliance, the data to yield an encrypted data set; and providing, by the virtual machine network security appliance, the security encrypted data set to the network device via an external communication path between the virtual machine network security appliance and an external port of the container server. In some such instances, the methods further include: configuring the communication path internal to the container server; and configuring external communication path between the virtual machine network security appliance and an external port of the container server. In some cases where the container server is a first container server, the network device is a container application implemented on a second container server.

In some instances of the aforementioned embodiments, the security process includes one or more of the following processes: an authentication process, a firewall protection process, an antivirus scanning process, a content filtering process, a data privacy protection process, a web filtering process, a network traffic inspection process, an intrusion prevention process, an intrusion detection process, denial of service attack detection process, a denial of service mitigation process, a decryption process, an application control process, a virtual private networking process, a data leak prevention process, an antispam process, an antispyware process, a logging process, a reputation-based protection process, an event correlation process, a network access control process, and/or a vulnerability management process.

Other embodiments provide container servers that include: a processing resource and a non-transient computer readable medium coupled to the processing resource. The non-transient has stored therein instructions that when executed by the processing resource cause the processing resource to: implement a communication path internal to the container server; implement a container application; and implement a virtual machine network security appliance. The virtual machine network security appliance is configured to: receive a request to transfer data to the container application, wherein the request indicates a source device; perform a security process on the data to yield security processed data; and provide the security processed data to the container application via the communication path.

Yet other embodiments provide non-transient computer readable media that have stored therein instructions that when executed by a processing resource cause the processing resource to: implement a communication path internal to the container server; implement a container application; and implement a virtual machine network security appliance. The virtual machine network security appliance is configured to: receive a request to transfer data to the container application, wherein the request indicates a source device; perform a security process on the data to yield security processed data; and provide the security processed data to the container application via the communication path.

Turning to FIG. 1A, network architecture 100 including container servers 102 (e.g., container server 102a and container server 102b) is shown in accordance with some embodiments. In the context of network architecture 100, one or more container servers 102 (e.g., container server 102a and container server 102b) and/or one or more network devices 104 (e.g., network device 104a, network device 104b, and network device 104c) are coupled via a communication network 101. Container server 102a includes a physical port 118a and container server 102b includes a physical port 118b. Communication network 101 may be any type of communication network known in the art. Those skilled in the art will appreciate that communication network 101 can be wireless network, a wired network, or a combination thereof that can be implemented as one of the various types of networks, such as an Intranet, a Local Area Network (LAN), a Wide Area Network (WAN), an Internet, and the like. Further, communication network 101 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110, and access to local network 124 is controlled by a network security appliance 120. A number of communication networks (e.g., communication network 101, communication network 102, and communication network 103) couple local network 114 to local network 124. Communication networks 101, 102, 103 may be any type of communication network known in the art. Those skilled in the art will appreciate that, each of communication networks 101, 102, 103 can be wireless network, a wired network, or a combination thereof that can be implemented as one of the various types of networks, such as an Intranet, a Local Area Network (LAN), a Wide Area Network (WAN), an Internet, and the like. Further, communication networks 101, 102, 103 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. In some embodiments, none of communication networks 101, 102, 103 share common infrastructure. In various embodiments, each of communication networks 101, 102, 103 are maintained and operated by separate communication providers.

Network security appliance 110 is coupled to a computer readable storage medium having stored thereon a multi-link access key distribution application 112. As more fully described below, multi-link access key distribution application 112 operates to segregate keys from data in communications between a network appliance 116 on local network 114 and a network element 126 on local network 124. This is done by performing key transfer operations on one of communication networks 101, 102, 103, and data transfer operations on another of communication networks 101, 102, 103. Similarly, network security appliance 120 is coupled to a computer readable storage medium having stored thereon a multi-link access key distribution application 122. As more fully described below, multi-link access key distribution application 122 operates to segregate keys from data in communications between a network appliance 116 on local network 114 and a network element 126 on local network 124. This is done by performing key transfer operations on one of communication networks 101, 102, 103, and data transfer operations on another of communication networks 101, 102, 103.

Figure 1B:
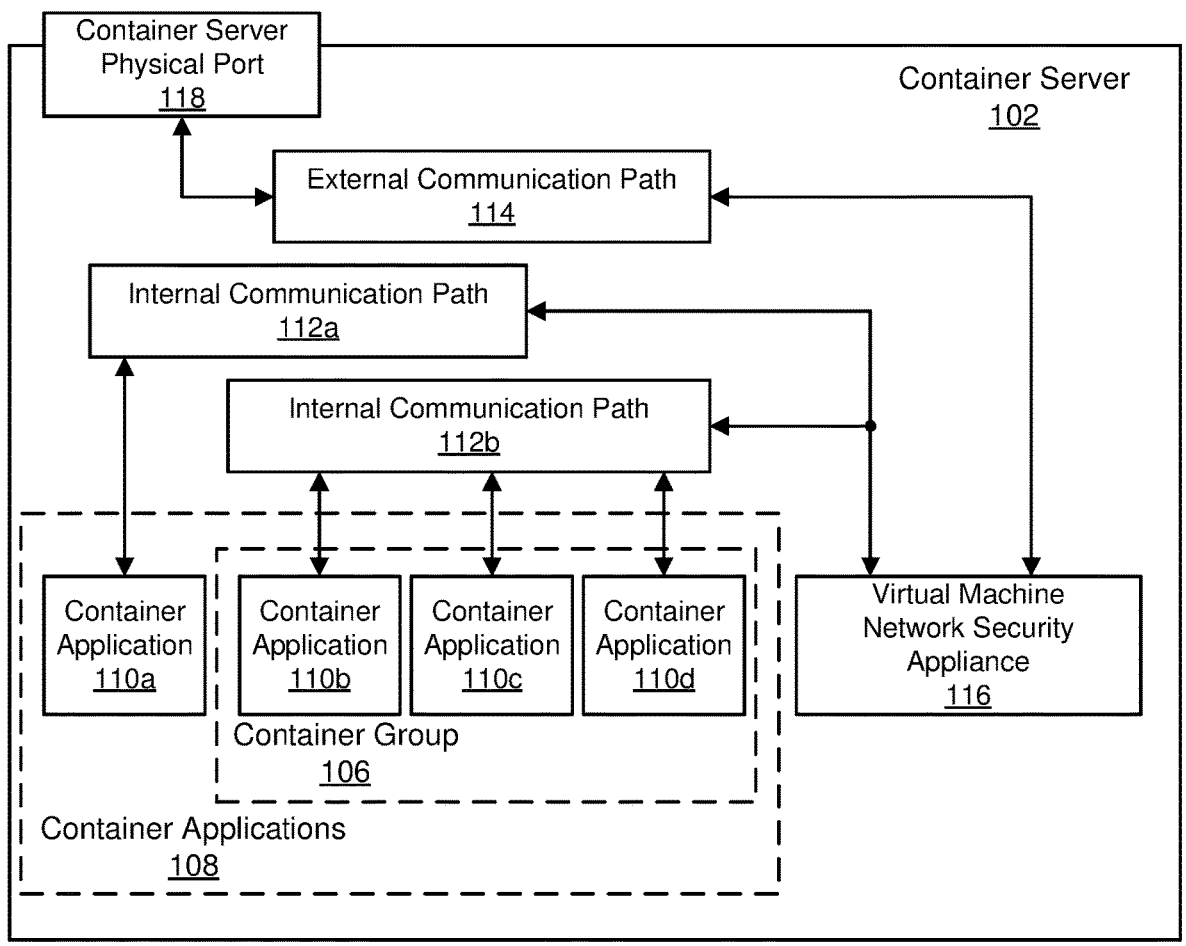

Turning to FIG. 1B, an example container server 102 is shown in accordance with some embodiments. Container server 102 includes a virtual machine network security appliance 116 that performs various data processing functions between data communicated between network elements outside of container server 102 (e.g., another container server 102, BGP server 103, and/or another network device (not shown)) and a container application 110 (e.g., container application 110a, container application 110b, container application 110c, and container application 110d) executing on container server 102, and between two container applications 110 executing on container server 102. Virtual machine network security appliance 116 may be any virtual machine that performs processing of data for security purposes. Such security purposes may include, but are not limited to, authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Based upon the disclosure provided herein, one of ordinary skill in the art will recognize a variety of security processes that may be implemented in accordance with different embodiments. In some embodiments, virtual machine network security appliance 116 may be a virtual implementation of a known network security appliance including, but not limited to, network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

Container server 102 additionally includes a number of container applications 110 (e.g., container application 110a, container application 110b, container application 110c, and container application 110d). Container applications 110 may be any software application or virtual machine that is accessible via a communication network. Such container applications may include, but are not limited, reservation applications, payment applications, web server applications, virtual servers, a network appliance implemented as a virtual machine, and/or the like. Based upon the disclosure provided herein, one of ordinary skill in the art will recognize a variety of container applications that may be used in relation to different embodiments. Such container applications 110 may be deployed in either a third party server where server space is leased or a server maintained by the same entity that provides the container application(s).

Some container applications 110 (e.g., container application 110b, container application 110c, and container application 110d) may be included within the same security group (i.e., container group 106), where other container applications 110 (e.g., container application A) is outside of container group 106. By including container applications 110 together within container group 106, communications between the included container applications 110 are not processed by virtual machine network security appliance 116 as the designate intra-container communications are considered secure. In contrast, communications between two container applications 110 that are not designated as being in the same group (e.g. container application 110a and container application 110b) are processed through virtual machine network security appliance 116 for security purposes.

Communications between container application 110a and network devices external to container server 102 are performed by sending data via a combination of an internal communication path 112a and an external communication path 114 where the data passes through and is processed by virtual machine network security appliance 116. Communications between container application 110a and other container applications 110 executing on container server 102 are performed by sending data via a combination of internal communication path 112a and an internal communication path 112*b* where the data passes through and is processed by virtual machine network security appliance 116. Communications between any container application 110 in container group 106 and network devices external to container server 102 are performed by sending data via a combination of internal communication path 112*b* and external communication path 114 where the data passes through and is processed by virtual machine network security appliance 116. Communications between any container application 110 in container group 106 and a container application 110 outside of container group 106 (e.g., container application 110*a*) are performed by sending data via a combination of internal communication path 112*a* and internal communication path 112*b* where the data passes through and is processed by virtual machine network security appliance 116. Communications between any container application 110 in container group 106 and any other container application 110 within container group 106 are performed by sending data via internal communication path 112*b* without passing through or processing by virtual machine network security appliance 116. In operation, virtual machine network security appliance 116 concentrates traffic from various sources (e.g., internal communication path 112*a*, internal communication path 112*b*, and external communication path 114) and applies various policy rules and other security processes before forwarding the processed traffic to the designated recipients.

Internal communications paths 112 and external communication path 114 are by the operating system (e.g., Linux™) running on container server 102. Based upon the disclosure provided herein, one of ordinary skill in the art will appreciate various mechanisms and/or features of the operating system that may be used to configure internal communications paths 112 and external communication path 114. External communication path 114 couples virtual machine network security appliance 116 to a physical port 118 of container server 102. Physical port 118 may be, but is not limited to an Ethernet port.

Figure 1C:
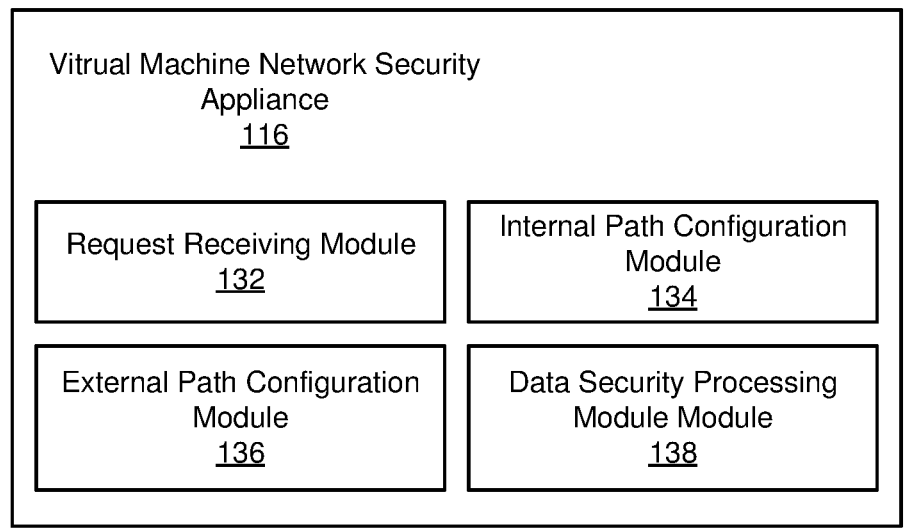

Turning to FIG. 1C, a block diagram of an example virtual machine network security appliance 116 is shown in accordance with some embodiments. In this embodiment, virtual machine network security appliance 116 includes: a request receiving module 132, an internal path configuration module 134, an external path configuration module 136, and a data security processing module 138.

Request receiving module 132 is configured to receive requests to communicate with designated network devices and/or container applications. The request may be received from: (a) a container application 110 executing on the same container server 102 where virtual machine network security appliance 116 is executing, (b) a container application 110 executing on a container server 102 that is different from the container server 102 where virtual machine network security appliance 116 is executing, or (c) from a network device. The request includes an indication of a recipient device and, in some cases, an indication of whether secured communications are required. Request receiving module 132 parses the request to determine whether a first device in the request (e.g., the requesting device) is a container application that is within the same container server and container group of the container server as a second device (i.e., the recipient device).

Where the first device is a container application that is within the same container server and container group of the container server as the second device (i.e., the second device is also a container application), request receiving module 132 causes internal path configuration module 134 to configure an internal group communication path between the first device and the second device. This internal communication path may be configured using, for example, any of the mechanisms and/or features available from the operating system running on the container server. Based upon the disclosure provided herein, one of ordinary skill in the art will appreciate various mechanisms and/or features of the operating system that may be used to configure the internal communication path.

Alternatively, where the first device is not a container application that is within the same container group of the container server as the second device, request receiving module 132 determines whether the first device is a container application within the same container server as the second device. Where the first device is a container application within the same container server as the second device (i.e., the second device is also a container application), request receiving module 132 causes internal path configuration module 134 to configure a group communication path between the first device and the second device, and for data security processing module 138 to perform data security processing on data passing over the configured internal path. Such may be done similar to that discussed below in relation to FIG. 4. Data security processing module 138 is configured to perform data security processes that may include, but are not limited to, authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Based upon the disclosure provided herein, one of ordinary skill in the art will recognize a variety of security processes that may be implemented in accordance with different embodiments.

Alternatively, where the first device is not a container application within the same container server as the second device (i.e., the first device is another network device, or the second device is either a container application in another container server or another network device), request receiving module 132 causes external path configuration module 136 to configure an external path between the first device and the second device, and for data security processing module 138 to perform data security processing on data passing over the configured external path. Such may be done similar to that discussed below in relation to FIG. 3.

Figure 1D:
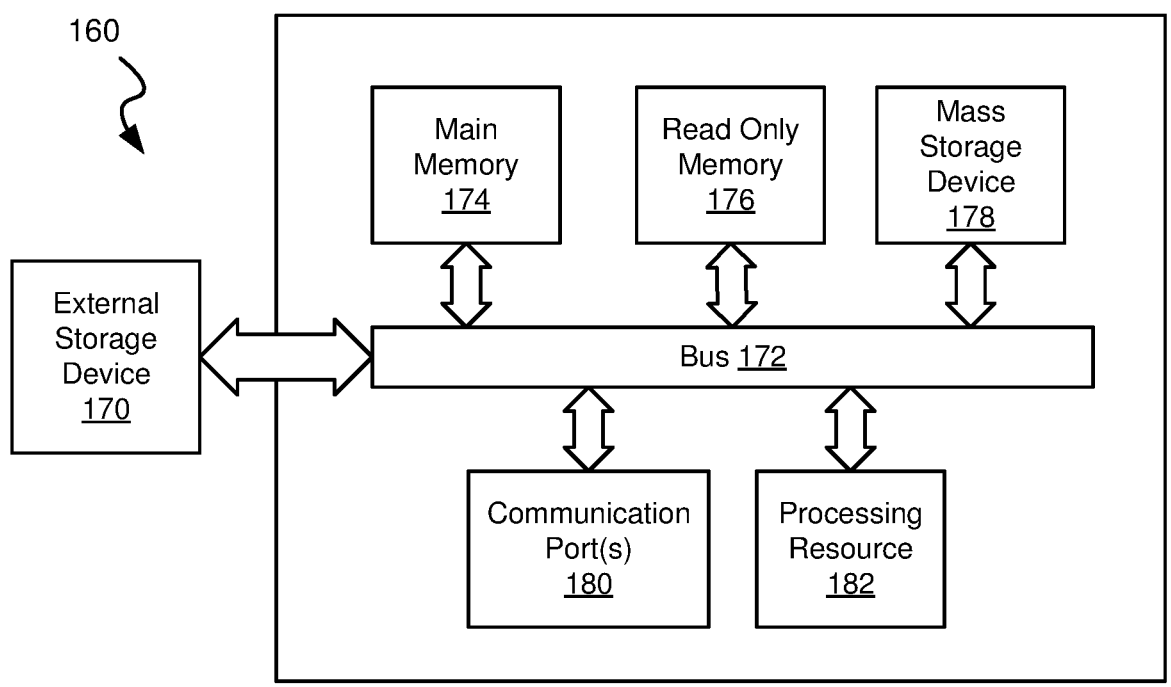

Turning to FIG. 1D, an example computer system 160 is shown in which or with which embodiments of the present disclosure may be utilized. As shown in FIG. 1D, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of container server 102, and/or other network devices.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
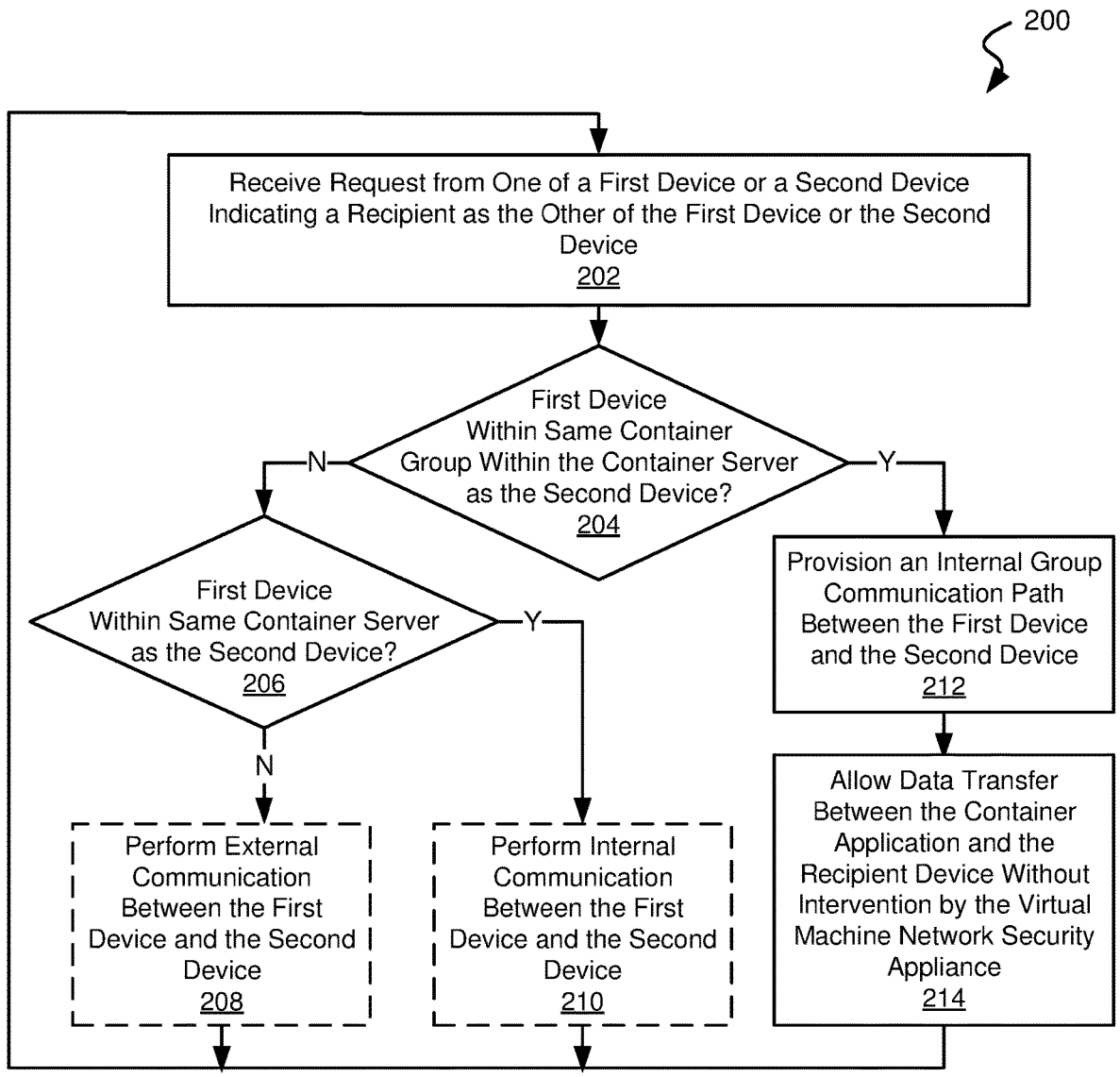
FIGS. 2-4 are flow diagrams showing a process for performing secure data transfer in a container server environment in accordance with various embodiments.

Turning to FIG. 2, a flow diagram 200 shows a method in accordance with some embodiments for performing secure data transfer in a container server environment in accordance with various embodiments. Following flow diagram 200, a request is received from one of a first device or a second device indicating a recipient as the other of the first device or second device (block 202). The first device may be any of: a container application within a container application, or a network device outside of the container server. The second device may be any of: a container server within a container group of the first device, a container application within the same container server as the first device but outside a container group of the first device, a container application in different container server than the first device, or a network device. Based upon the disclosure provided herein, one of ordinary skill in the art will recognize a number of combinations of network devices and container applications that may be used as the first device and the second device in accordance with different embodiments.

It is determined whether the first device is a container application that is within the same container server and container group of the container server as the second device (block 204). Where the first device is a container application that is within the same container server and container group of the container server as the second device (i.e., the second device is also a container application) (block 204), an internal group communication path is configured between the first device and the second device (block 212). This internal communication path may be configured using, for example, any of the mechanisms and/or features available from the operating system running on the container server. Based upon the disclosure provided herein, one of ordinary skill in the art will appreciate various mechanisms and/or features of the operating system that may be used to configure the internal communication path. With the internal communication path configured, communications between the first device and the second device are allowed to continue over the configured internal communication path without application of any policies or other security processes (block 214). This is because all communications between container applications within the same container group are designated as secure.

Alternatively, where the first device is not a container application that is within the same container group of the container server as the second device (block 204), it is determined whether the first device is a container application within the same container server as the second device (block 206). Where the first device is a container application within the same container server as the second device (i.e., the second device is also a container application) (block 206), internal communication between container applications of the same container server is performed (block 210). Block 210 is shown in dashed lines as the process is discussed below in relation to FIG. 4.

Alternatively, where the first device is not a container application within the same container server as the second device (i.e., the first device is another network device, or the second device is either a container application in another container server or another network device) (block 206), external communications are performed between: (1) two container applications implemented on different container servers, or (2) a container application and another network device (block 208). Block 208 is shown in dashed lines as the process is discussed below in relation to FIG. 3.

Figure 3:
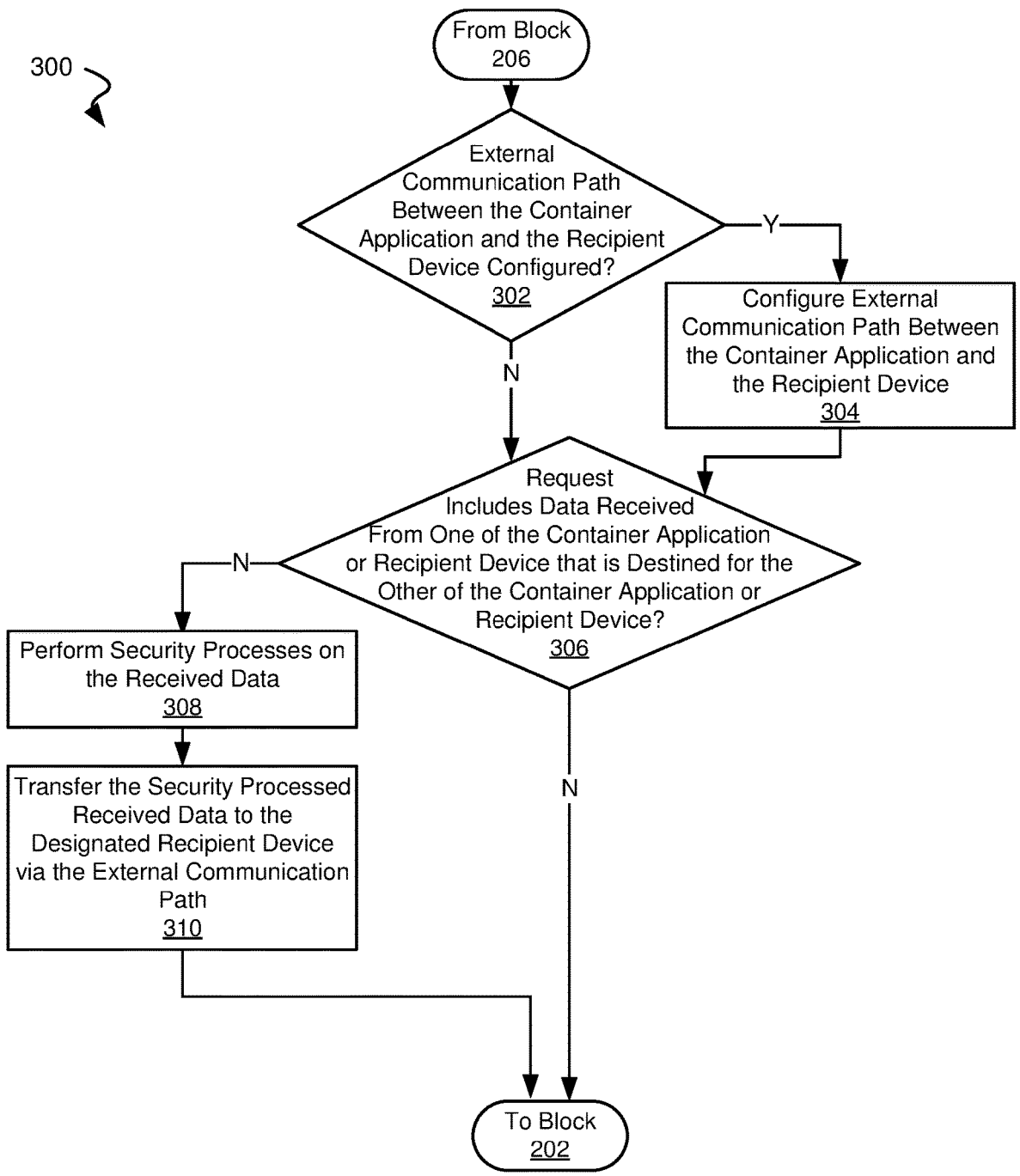

Turning to FIG. 3, a flow diagram 300 shows a method in accordance with some embodiments for performing external communication between: (1) two container applications implemented on different container servers, or (2) a container application and another network device in accordance with various embodiments. Following flow diagram 300, it is determined whether an external communication path has already been configured between the first device and the second device (block 302). Where an external communication path has not already been configured between the first device and the second device (block 302), an external communication path between the first device and the second device is configured (block 304). The external communication path may be configured as a first path from the first device to the virtual machine network security appliance and a second path between the virtual machine network security appliance and the second device. The second path may be, for example, an IPSec tunnel between the virtual machine network security appliance and the second device as is known in the art. As such, the data received from the sending device is encrypted before being sent to the recipient device. Alternatively, the second path may be a regular, unsecured path configured using an internal routing table is developed from knowledge of a datacenter in which a container server is deployed, and the internal routing table is used to define an external communication path including zero or more hops between the sending device and the recipient device as is known in the art. This may be done using, for example, an auto discovery virtual private network function in a virtual machine network security appliance in combination with border gate protocol information. Such an approach yields a tunnel between the virtual machine network security appliance and the second device. In some embodiments, a border gate protocol server coupled to the container server advertises both secured or regular, unsecured communication paths to both physical network security appliances and virtual machine network security appliances implemented within respective container servers whether they are the HUB acting as a router reflector. Virtual machine network security appliances executing within a container server in turn have a neighbor session with the HUB to receive all appropriate routes. As such, configuring external communication paths may be done in accordance with the following topologies within a datacenter: Hub-Spoke, Full Mesh, and Partial Mesh.

Once the communication path has been configured (block 304) or if it had previously been configured (block 302), it is determined whether the received request (i.e., the request discussed in block 202 of FIG. 2) includes data to be transferred from a sender to a recipient (block 306). Where the request does not include data to be transferred from a sender to a recipient (block 306), processing returns to block 202 of FIG. 2.

Alternatively, where the request includes data to be transferred from a sender to a recipient (block 306), security processes of the virtual machine network security appliance are applied to the received data (block 308). The processed data is then transferred or sent to the recipient device via the external communication path (block 310). At this juncture, processing returns to block 202 of FIG. 2.

Figure 4:
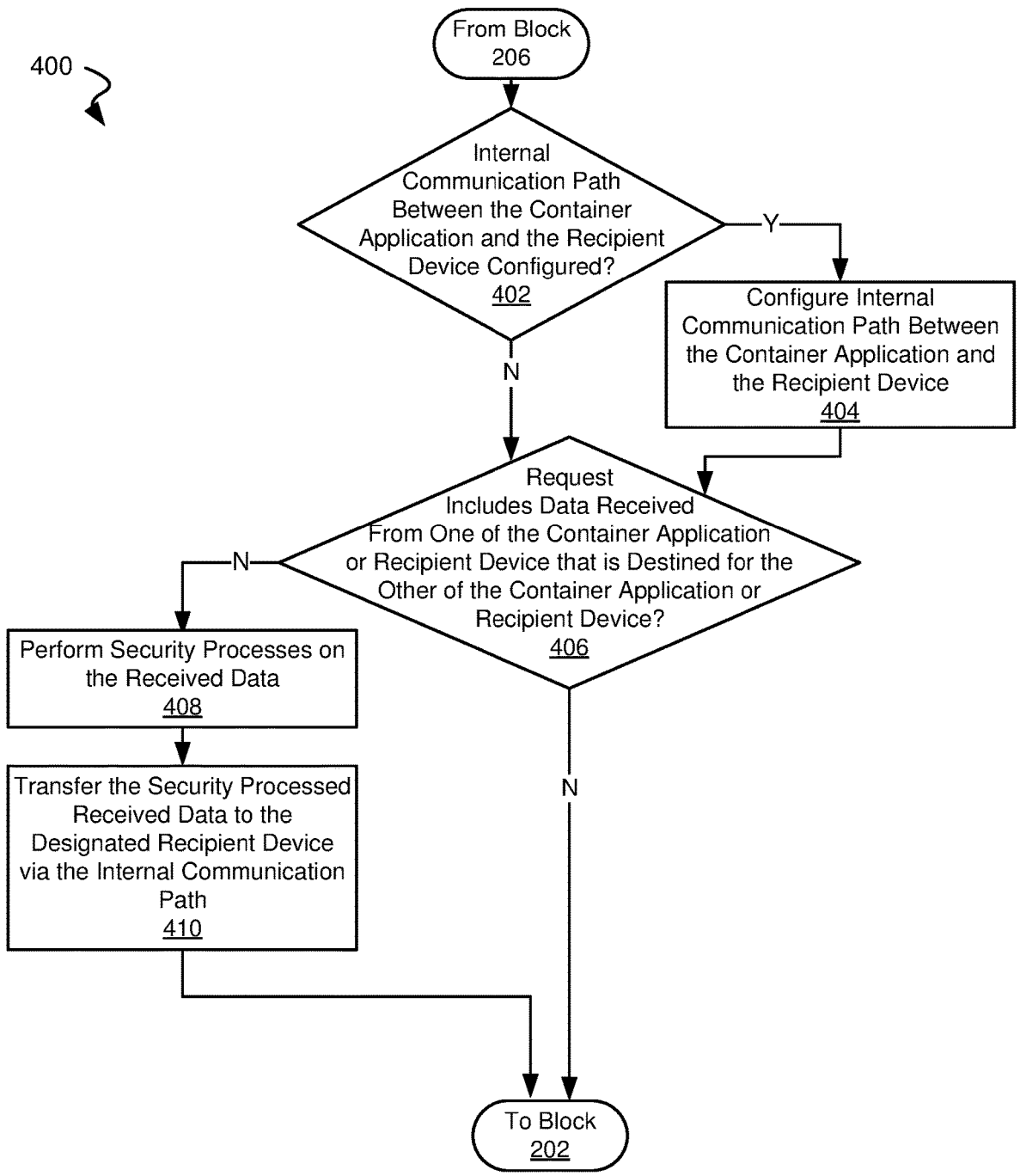

Turning to FIG. 4, a flow diagram 400 shows a method in accordance with some embodiments for performing internal communication between two container applications implemented on the same container server in accordance with some embodiments. Following flow diagram 400, it is determined whether an internal communication path has already been configured between the first device and the second device (block 402). Where an internal communication path has not already been configured between the first device and the second device (block 402), an internal communication path between the first device and the second device is configured (block 404). The internal communication path may be configured as a first path from the first device to the virtual machine network security appliance and a second path between the virtual machine network security appliance and the second device. Both the first path and the second path may be configured using various mechanisms and/or features of the operating system running on the container server that includes the first device and the second device.

Once the communication path has been configured (block 404) or if it had previously been configured (block 402), it is determined whether the received request (i.e., the request discussed in block 202 of FIG. 2) includes data to be transferred from a sender to a recipient (block 406). Where the request does not include data to be transferred from a sender to a recipient (block 406), processing returns to block 202 of FIG. 2.

Alternatively, where the request includes data to be transferred from a sender to a recipient (block 406), security processes of the virtual machine network security appliance are applied to the received data (block 408). The processed data is then transferred or sent to the recipient device via the external communication path (block 410). At this juncture, processing returns to block 202 of FIG. 2.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for providing network security services, the method comprising:
    receiving, by a virtual machine network security appliance implemented in a container server, a request to transfer data to a container application implemented in the container server, wherein the request indicates a source device;
    provisioning an internal communication path between the source device and a destination device, if a source container and a destination container are within a single container group;
    performing an internal communication between the source device and the destination device, if the source device and the destination device are not within a single container group and the source device and the destination device are within a single container server;
    performing an external communication between the source device and the destination device, if the source device and the destination device are not within a single container group and the source device and the destination device are not within a single container server;
    allowing data transfer between the source device and the destination device via one of the internal communication path, the internal communication and the external communication, without intervention by a virtual machine network security appliance;
    performing, by the virtual machine network security appliance after the allowed data transfer between the source device and the destination device, a security process on the data to yield security processed data; and
    providing, by the virtual machine network security appliance, the security processed data to the container application via a communication path internal to the container server.

2. The method of claim 1, wherein the communication path internal to the container server is a first internal communication path, wherein the container application is a first container application, wherein the source device is a second container application implemented in the container server, and wherein receiving the request is done via a second internal communication path.

3. The method of claim 2, the method further comprising:
    configuring the first internal communication path; and
    configuring the second internal communication path.

4. The method of claim 1, wherein the source device is a network device outside of the container server, and wherein receiving the request is done via an external communication path between the virtual machine network security appliance and an external port of the container server.

5. The method of claim 4, the method further comprising:
configuring the communication path internal to the container server; and
configuring external communication path between the virtual machine network security appliance and an external port of the container server.

6. The method of claim 4, wherein the container server is a first container server, and wherein the network device is a container application implemented on a second container server.

7. The method of claim 1, wherein the request is a first request, and wherein the method further comprises:
receiving, by the virtual machine network security appliance, a second request to transfer data from the container application to a network device outside of the container server;
encrypting, by the virtual machine network security appliance, the data to yield an encrypted data set; and
providing, by the virtual machine network security appliance, the encrypted data set to the network device via an external communication path between the virtual machine network security appliance and an external port of the container server.

8. The method of claim 7, the method further comprising:
configuring the communication path internal to the container server; and
configuring external communication path between the virtual machine network security appliance and an external port of the container server.

9. The method of claim 7, wherein the container server is a first container server, and wherein the network device is a container application implemented on a second container server.

10. The method of claim 1, wherein the security process includes one or more of the following processes: an authentication process, a firewall protection process, an antivirus scanning process, a content filtering process, a data privacy protection process, a web filtering process, a network traffic inspection process, an intrusion prevention process, an intrusion detection process, denial of service attack detection process, a denial of service mitigation process, a decryption process, an application control process, a virtual private networking process, a data leak prevention process, an antispam process, an antispyware process, a logging process, a reputation-based protection process, an event correlation process, a network access control process, or a vulnerability management process.

11. A container server, the container server comprising:
a processing resource;
a non-transient computer readable medium coupled to the processing resource and having stored therein instructions that when executed by the processing resource cause the processing resource to:
implement a communication path internal to the container server;
implement a container application; and
implement a virtual machine network security appliance to:
receive a request to transfer data to the container application, wherein the request indicates a source device;
provision an internal communication path between the source device and a destination device, if a source container and a destination container are within a single container group;
perform an internal communication between the source device and the destination device, if the source device and the destination device are not within a single container group and the source device and the destination device are within a single container server;
perform an external communication between the source device and the destination device, if the source device and the destination device are not within a single container group and the source device and the destination device are not within a single container server;
allow data transfer between the source device and the destination device via one of the internal communication path, the internal communication and the external communication, without intervention by a virtual machine network security appliance;
perform a security process on the data to yield security processed data after the allowed data transfer between the source device and the destination device; and
provide the security processed data to the container application via the communication path.

12. The container server of claim 11, wherein the communication path internal to the container server is a first internal communication path, wherein the container application is a first container application, wherein the instructions that when executed by the processing resource further cause the processing resource to:
implement a container application; and
implement a second internal communication path, wherein the request is received via the second internal communication path.

13. The container server of claim 11, wherein the source device is a network device outside of the container server, and wherein the instructions that when executed by the processing resource further cause the processing resource to:
implement an external communication path between the virtual machine network security appliance and an external port of the container server, wherein the request is received via the external communication path.

14. The container server of claim 11, wherein the request is a first request, and wherein the instructions that when executed by the processing resource further cause the processing resource to:
receive a second request to transfer data from the container application to a network device outside of the container server;
encrypt the data to yield an encrypted data set; and
provide the encrypted data set to the network device via an external communication path between the virtual machine network security appliance and an external port of the container server.

15. The container server of claim 14, wherein the container server is a first container server, and wherein the network device is a container application implemented on a second container server.

16. The container server of claim 11, wherein the security process includes one or more of the following processes: an authentication process, a firewall protection process, an antivirus scanning process, a content filtering process, a data privacy protection process, a web filtering process, a network traffic inspection process, an intrusion prevention process, an intrusion detection process, denial of service attack detection process, a denial of service mitigation process, a decryption process, an application control process, a virtual private networking process, a data leak prevention process, an antispam process, an antispyware process, a logging process, a reputation-based protection process, an event correlation process, a network access control process, or a vulnerability management process.

17. A non-transient computer readable medium having stored therein instructions that when executed by a processing resource cause the processing resource to:
implement a communication path internal to a container server;
implement a container application; and
implement a virtual machine network security appliance to:
receive a request to transfer data to the container application, wherein the request indicates a source device;
provision an internal communication path between the source device and a destination device, if a source container and a destination container are within a single container group;
perform an internal communication between the source device and the destination device, if the source device and the destination device are not within a single container group and the source device and the destination device are within a single container server;
perform an external communication between the source device and the destination device, if the source device and the destination device are not within a single container group and the source device and the destination device are not within a single container server;
allow data transfer between the source device and the destination device via one of the internal communication path, the internal communication and the external communication, without intervention by a virtual machine network security appliance;
perform a security process on the data to yield security processed data after the allowed data transfer between the source device and the destination device; and
provide the security processed data to the container application via the communication path.

18. The non-transient computer readable medium of claim 17, wherein the communication path internal to the container server is a first internal communication path, wherein the container application is a first container application, wherein the instructions that when executed by the processing resource further cause the processing resource to:
implement a container application; and
implement a second internal communication path, wherein the request is received via the second internal communication path.

19. The non-transient computer readable medium of claim 17, wherein the source device is a network device outside of the container server, and wherein the instructions that when executed by the processing resource further cause the processing resource to:
implement an external communication path between the virtual machine network security appliance and an external port of the container server, wherein the request is received via the external communication path.

20. The non-transient computer readable medium of claim 17, wherein the request is a first request, and wherein the instructions that when executed by the processing resource further cause the processing resource to:
receive a second request to transfer data from the container application to a network device outside of the container server;
encrypt the data to yield an encrypted data set; and
provide the encrypted data set to the network device via an external communication path between the virtual machine network security appliance and an external port of the container server.

21. The non-transient computer readable medium of claim 17, wherein the security process includes one or more of the following processes: an authentication process, a firewall protection process, an antivirus scanning process, a content filtering process, a data privacy protection process, a web filtering process, a network traffic inspection process, an intrusion prevention process, an intrusion detection process, denial of service attack detection process, a denial of service mitigation process, a decryption process, an application control process, a virtual private networking process, a data leak prevention process, an antispam process, an antispyware process, a logging process, a reputation-based protection process, an event correlation process, a network access control process, or a vulnerability management process.

* * * * *